US005774887A

United States Patent [19]

Wolff et al.

[11] Patent Number: 5,774,887

[45] Date of Patent: Jun. 30, 1998

[54] CUSTOMER SERVICE ELECTRONIC FORM GENERATING SYSTEM

[75] Inventors: Alan Scott Wolff, Boulder; Hans Brunner, Denver, both of Colo.

[73] Assignee: U S West Advanced Technologies, Inc., Boulder, Colo.

[21] Appl. No.: 977,982

[22] Filed: Nov. 18, 1992

[51] Int. Cl.[6] .......... G06F 17/30

[52] U.S. Cl. .......... 707/1; 707/102; 707/104; 707/508

[58] Field of Search .......... 364/DIG. 1, DIG. 2; 395/145, 146, 148, 149, 600, 612, 604, 615, 761, 762, 764, 765–769, 613; 707/1, 4, 100–102, 104, 500, 501, 503–508

[56] References Cited

U.S. PATENT DOCUMENTS

| | | | |
|---|---|---|---|
| 4,308,582 | 12/1981 | Berger | 364/300 |
| 4,903,229 | 2/1990 | Schmidt et al. | 364/900 |
| 5,033,009 | 7/1991 | Dubnoff | 364/523 |
| 5,047,960 | 9/1991 | Sloan | 364/523 |
| 5,189,608 | 2/1993 | Lyons et al. | 364/408 |
| 5,208,907 | 5/1993 | Shelton et al. | 395/149 |
| 5,228,121 | 7/1993 | Fontaine et al. | 395/145 |
| 5,267,155 | 11/1993 | Buchanan et al. | 364/419.14 |
| 5,280,610 | 1/1994 | Travis, Jr. et al. | 395/600 |
| 5,299,305 | 3/1994 | Oomae et al. | 395/149 |
| 5,317,646 | 5/1994 | Sang, Jr. et al. | 382/9 |
| 5,319,777 | 6/1994 | Perez | 395/600 |
| 5,392,390 | 2/1995 | Crozier | 395/161 |

*Primary Examiner*—Thomas G. Black
*Assistant Examiner*—Maria N. Von Buhr

[57] ABSTRACT

An apparatus for producing a series of electronic forms that are related to completing a task. The apparatus includes a computer system in which one or more databases are stored. The computer system displays a list of tasks that can be selected by a customer service representative. Each task has associated with it a series of forms that must be completed. Each form includes a plurality of fields, each of which has an associated database. A code segment associated with each field processes data as it is entered into the field and stores the data in the field's associated database. The system also provides a task map indicating the forms that must be completed to finish a given task, as well as the forms that have already been completed.

24 Claims, 7 Drawing Sheets

CUSTOMER SERVICE ELECTRONIC FORM GENERATING SYSTEM

FIELD OF THE INVENTION

The invention relates to database applications run on computer systems in general and, in particular, to a computer system that produces forms.

BACKGROUND OF THE INVENTION

Two of the most common items found in every modern business are computers and forms. Computers are used by businesses to store large amounts of data, produce reports, and generate bills, as well as perform numerous other tasks. Data is typically stored in a computer using a database program. Often a business may have several database programs running on the same computer system, wherein each database program is primarily used for a different function. One database may contain billing information, while another is used to keep track of customer names and addresses. Often these database programs are incompatible and cannot share data directly. Therefore, even though the databases are accessible on the same computer system, a computer operator is often required to enter the same data separately in each database. This can be both time consuming and confusing due to the way in which data must be entered in each database, as well as the particular commands required to store and retrieve data in each database. For example, two databases may require an operator to enter two different, unrelated codes to signify the same information, or may require the same data to be entered in a different order.

The second ubiquitous item in every modern business is the form. Forms are used for such diverse purposes as recording a customer's purchases, ordering inventory, requesting checks, paying bills, recording time, and a host of other functions. In general, forms are thought to provide an easily understandable format for gathering and presenting information. However, anyone who has ever filled out a form knows that they can often be tedious to complete, contain repetitive information, and only vaguely identify the information required.

Despite a computer's ability to handle and process large amounts of data quickly, the interface between computers, customer service representatives, and forms has not been very successful. This problem is particularly apparent in the communications industry where communication companies have very specific requirements with respect to the use of computers and forms. Generally, a given geographical area is served by one telephone company. The telephone company typically maintains records for each resident and business within the geographical area. These records, which are often kept in different databases, usually contain a customer's residence, billing information, number of phones, and options for phone service, such as call waiting, call forwarding, etc. Thus, a massive amount of customer data must be stored by a telephone company in several large databases, which may or may not be compatible with each other.

Most customer interaction with a telephone company takes place with a customer service representative who answers questions, sets up telephone service, requests service personnel to repair a customer's broken telephone, and perform other related functions. A customer service representative typically works at a computer station where he or she has access to the customer's records, which are stored in the various databases. Currently, when a customer asks a question or requests a new service, the representative fills out a series of computer displayed "electronic forms" associated with each database to order or complete the change of service or repair requested by a customer. Completion of the appropriate electronic form can cause considerable confusion for the customer service representative who must not only remember the sequence of forms to be filled out for each type of customer request, but also must remember the particular format required by each database program to store and retrieve information in each database in order to complete the request.

As will be appreciated, the amount of training customer service representatives must receive to perform their job effectively is extensive. In order to reduce the amount of training required, it is desirable to have a computer system that can integrate the various databases and forms that must be filled out in response to a customer request in a way that is not apparent to the customer service representative and does not require the customer service representative to know in advance the sequence of forms that must be completed to process a customer request.

Furthermore, it is desirable that the computer system present a form to a customer service representative in a way that is intuitive to complete and easy to follow. The computer system should also be able to provide on-line help to the customer service representative to allow the customer service representative to efficiently fill in the form. Finally, the computer system should provide the customer service representative with a map or schedule of the forms that must be filled in to complete the task of processing a customer request, as well as show which of these forms has already been completed to allow the customer service representative to gauge where the customer service representative is in relation to completing the task.

SUMMARY OF THE INVENTION

The present invention is a computer system for producing a series of electronic forms. Each form produced by the computer system can store and retrieve data directly from one or more databases coupled to the computer system without requiring separate database commands to be entered. The computer system first produces a list of tasks that can be selected by a customer service representative. Each task has a sequence of forms associated with it. Upon selecting a task, the computer produces the series of forms to be filled in. Each form includes a set of fields, each of which has one or more databases associated with it. Upon the entry of data into a field, a sequence of computer codes are executed to analyze the data and to store the data in the field's associated databases. Therefore, the operator is able to complete a task without having to remember the particular series of forms that must be filled out to complete a task and does not have to enter the data separately in each database.

BRIEF DESCRIPTION OF THE DRAWINGS

The foregoing advantages of this invention will become more readily appreciated as the same becomes better understood by reference to the following detailed description when taken in conjunction with the accompanying drawings wherein.

DETAILED DESCRIPTION OF THE PREFERRED EMBODIMENT

Figure 1:
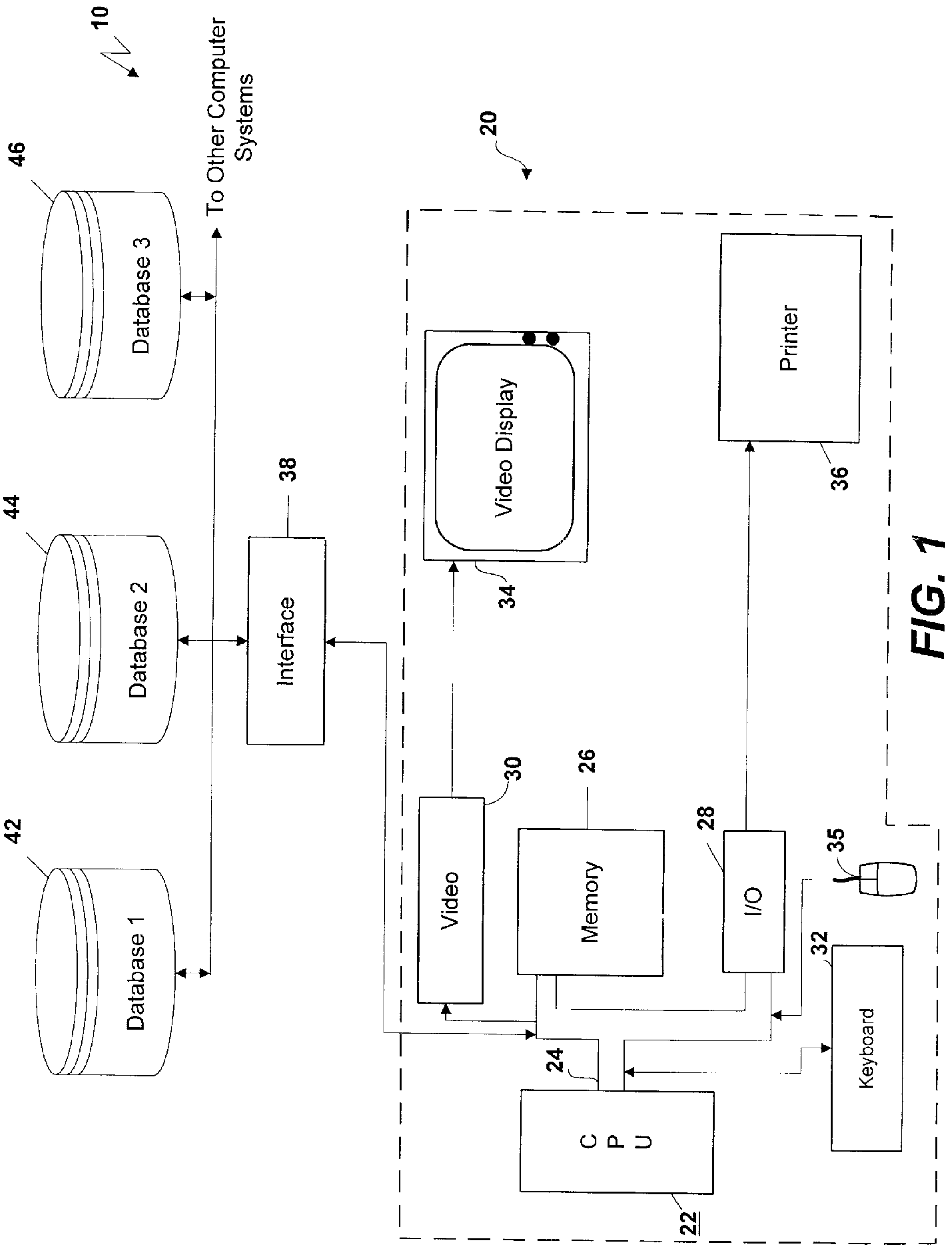
FIG. 1 illustrates a block diagram of an electronic form generating system according to the present invention.

FIG. 1 is a block diagram of an electronic form generating system according to the present invention. The computer system 10 includes a computer terminal 20, a network interface 38, and databases 42–46. The computer terminal 20 includes a central processing unit (CPU) 22, a memory 26, an input/output port 28, a video controller 30, a keyboard 32, a video display 34, a mouse 35 and a printer 36. The memory 26 and the input/output port 28 are connected to the CPU 22 via a bus 24. The input/output port 28 is used in connecting the CPU 22 to the printer 36. A video controller 30 is connected to the CPU 22 through bus 24 to drive a video display 34. Finally, the keyboard 32 and the mouse 35 are also connected to the CPU 22 through the bus 24.

Network interface 38 allows the computer terminal 20 to exchange information with other computer systems (not separately shown) on a network. The network interface 38 also allows computer terminal 20 to read and write data, respectively, from and to databases 42, 44, 46. These databases may or may not be compatible with each other. That is, each database may have a different format for storing and retrieving data as well as require different commands to retrieve and store data. The details of the computer terminal 20 and the network are well known to one of ordinary skill in the computer art and therefore will not be discussed further. Additionally, although the preferred embodiment of the present invention comprises a networked computer system, it will be appreciated that the present invention could also be implemented using a stand-alone personal computer.

In the environment in which the present invention is used, a customer service representative sits at the computer terminal 20 and receives telephone inquiries from customers. During the course of completing a task in response to a customer inquiry, the computer terminal 20 produces a series of electronic forms on the video display 34, which are filled in by the customer service representative. The computer terminal 20 allows the service representative to complete the series of forms required to complete a service task by retrieving and storing data in the different databases, but without requiring the customer service representative to separately enter or call up each database for entry of the data. Therefore, the different protocols or requirements of each database are not apparent to the customer service representative as he or she is helping a customer. Additionally, a hard copy of the electronic forms may be printed by the customer service representative on the printer 36 after the forms are completed to give to service repairmen or others who need a hard copy of the forms.

Figure 2:
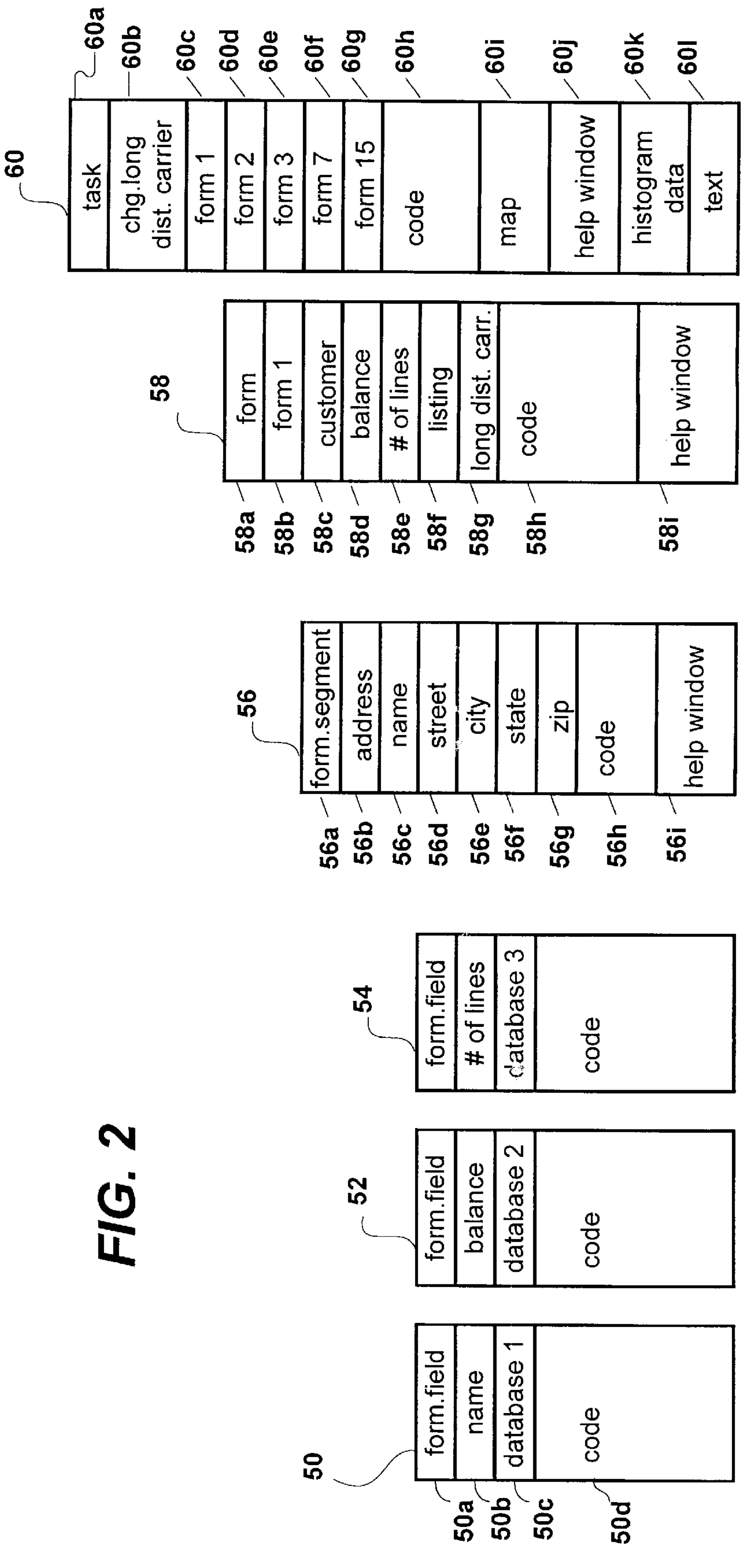
FIG. 2 is a pictorial diagram of four types of computer objects used by the electronic form generating system to produce a series of forms.

FIG. 2 shows the structure of a series of objects used by the computer terminal 20 (shown in FIG. 1) to produce the electronic forms. The computer terminal 20 is programmed in an object-oriented programming language (LISP) to manipulate various objects in order to produce the series of electronic forms required to complete a task in response to a customer inquiry. Before describing how the present invention produces the series of forms, it is helpful to present a brief overview of object-oriented programming. Object-oriented programming is well known in the art of digital computers and is described in detail in Cox, B. J., *Object-Oriented Programming: An Evolutionary Approach*, Addison-Wesley (1986); Stefik M. and Bobrow, D., *Object-oriented programming: Themes and Variations*, AI Magazine, Vol. 6, No. 4, pp. 40–62 (1986); and Kirkerud, B., *Object-Oriented programming With Simula*, Addison-Wesley (1989).

Object-oriented programming involves the concept of objects. Objects are collections of data and/or procedures that are treated as entities by a software program. An object in turn can be defined as a collection of slots, each of which may contain variables or data, short sections of computer code, or pointers to other objects. Unlike traditional linear programming techniques, program control in an object-oriented method does not proceed in a top down fashion through procedure calls. Instead, objects communicate with one another through message passing. Message passing is a type of indirect procedure call in which the message itself specifies the type of operation to be completed by the object to which the message is directed. An object responds to a message by executing an appropriate, predefined procedure or method. The method executed by an object may in turn generate another message that is sent to another object or to itself.

Object-oriented programs are usually organized hierarchically. At the top of the hierarchy are class objects. An object class is a collection of objects that are similar in some way. A subclass is a set of objects that is copied from an existing class of objects. A subclass usually modifies the existing class in some way to create a new class. When a subclass object is created, the subclass can automatically acquire data, methods, and slots from objects higher in the class hierarchy. This process is referred to as inheritance. Through inheritance, data, methods, and other characteristics of objects higher in the class hierarchy become available or assigned to objects lower in the hierarchy and need not be explicitly represented in the lower level object. The use of object-oriented programming in the present inventive system eliminates duplicative code segments and provides greater modularity. However, implementation of the present invention is not limited to use of object-oriented code, and other programming techniques such as the more traditional linear programming techniques could be used.

FIG. 2 shows the hierarchy of the objects manipulated by the computer terminal 20 to produce the electronic forms according to the present invention. The present invention uses four types of objects to create the sequence of electronic forms that handles a customer inquiry. The first type of object is a form.field object, illustrated as objects 50–54. The form.field objects each comprise an individual entry or field on an electronic form similar to a blank on a standard paper form. Logically connected form.field objects are combined into a form.segment object, such as object 56. An example of a common segment found on an electronic form is a customer's address segment, which typically includes fields for a customer's name, street address, city, state and zip code. Therefore, a form.segment object for an address segment includes a series of form.field objects, one for the customer's name, another for the street address, one for the city, one for the state, etc. As will be further described below, groups of form.segment objects and/or individual form.field objects are combined to create a form-type object that represents a single electronic form, such as object 58. Each slot contained within a form-type object contains a pointer to those form.segment objects or form.field objects that comprise the form. The last type of object included in the present invention is a task-type object, an example of which is shown as task 60. The task-type object specifies the series of forms required to complete an individual task. The task-type object includes pointers to the individual form-type objects required to complete the particular task.

In the preferred embodiment, each of the form.field objects includes at least four slots. For example, object 50 includes four slots 50*a*, 50*b*, 50*c* and 50*d*. Slot 50*a* specifies the type of object, in this case a form.field object. The slot 50*b* specifies the type of data referenced by the object, i.e., the customer's name. The slot 50*c* contains a reference to a database for which the data referenced by the object are to be stored. In this case, the slot 50*c* indicates that the customer's name data are to be stored in the database 42 shown in FIG. 1. Finally, the slot 50*d* includes a section of computer code that is specifically written to operate on the data entered into the name field.

The computer code contained in slot 50*d* of the form.field object contains those commands required to use the object's corresponding database. As will be further described below, the code contained in slot 50*d* contains commands that cause the database 42 to search for the customer's name and enter a new name to the data stored if the customer's name had not been previously stored in the database. By having the particular commands associated with the different databases located in the individual form.field objects, the customer service representative is freed from having to actually enter the different databases one at a time and performing the database inquiries and updates manually. The database inquires made by the form.field objects occur in the background while the computer system is running and are not apparent to the customer service representative. As will be further described below, the customer service representative only perceives that he or she is filling in a single form and may be unaware that the computer system is actually accessing the different databases as the forms are being filled in. It is possible that one form.field object may have more than one database associated with it. In that case, the data is stored in each database indicated in the form.field's slots.

Figure 3:
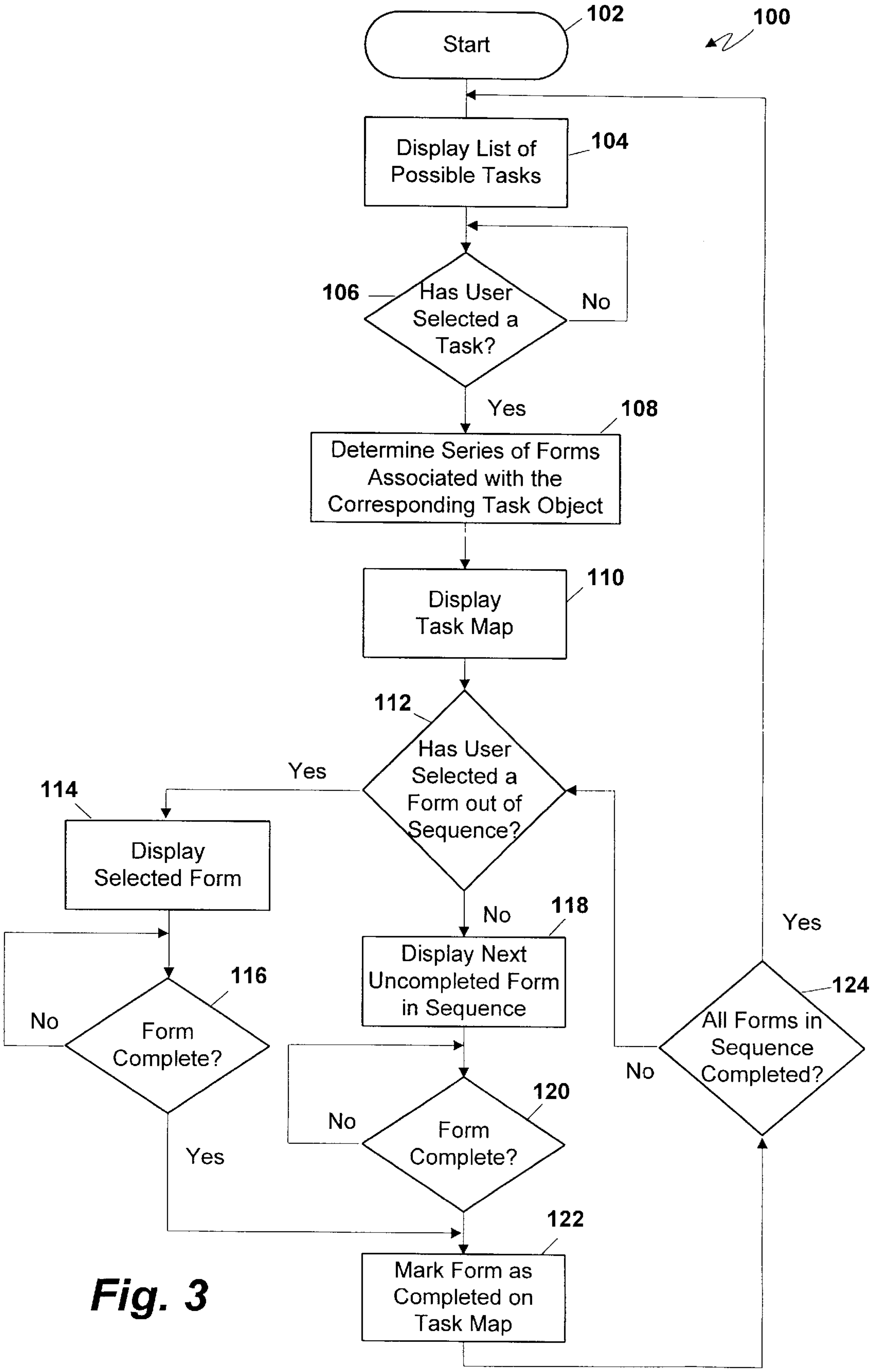
FIG. 3 is a flow diagram that shows how the form generating system prompts a customer service representative to select a task.

Also shown in FIG. 3 are two additional form.field objects. Object 52 displays a customer's balance in a field on an electronic form. The customer balance data is associated with a database 44 shown in FIG. 1. Finally, a third example, form.field object 54, is shown that displays the number of telephone lines a customer has on an electronic form. Data concerning the number of telephone lines entering a customer's house are stored in a database 46 that is separate from the above-referenced databases. Each of these objects includes a code segment that is specific to its corresponding database, such that when the customer service representative enters data into these fields on the video display, the code segment performs the necessary commands to recall the data from the various databases and update the stored data if required.

As described above, logically grouped form.field objects are combined to create the form.segment-type object. The object 56, which is of the form.segment type, includes a plurality of slots 56*a*–56*i*. The slot 56*a* signifies the type of object, i.e., a form.segment object. The slot 56*b* identifies the name of the object, in this case a customer's address. Slots 56*c*–56*g* contain pointers to a series of form.field objects similar to objects 50, 52 and 54 described above. The objects in those slots would be for fields concerning the customer's street, city, state, and zip code. The slot 56*h* contains a segment of computer code. The computer code contained within a form.segment type object is specific to the object itself The code may contain commands to highlight portions of the segment, or black out portions that do not need to be filled in, when a form that includes the address segment is displayed. Finally, the slot 56*i* contains a pointer to a help window. When selected by the customer service representative, a segment having a help window displays an example of how the fields that comprise the segment should be completed. Additionally, the help window produces textual instructions that are displayed to the service representative, explaining how to complete the particular segment.

The next level of object included in the hierarchy of objects in the present system is the form-type object. For example, the object 58 includes a plurality of slots 58*a*–58*i*. The slot 58*a* signifies the type of object, i.e., a form-type object. Slot 58*b* includes the title of the object that distinguishes it from the other form objects; in this case object 58 is called "form 1." Slots 58*c*–58*g* contain pointers to various form.field objects and form.segment objects that comprise the electronic form 1. Therefore, the slots within a particular form object include pointers to those field or segment objects that will appear on the video display screen as the electronic form for the customer service representative to observe and fill in.

The slot 58*h* contains a segment of computer code that is customized for the particular form 1. The code segment may cause some portions of the form to become highlighted, signifying that they need to be filled out, or may perform such other tasks as parsing the entries to detect errors entered by the customer service representative. For example, if a customer service representative enters a negative number for the number of people living in the household, the computer segment for the particular form will indicate this entry as being invalid and will request the customer service representative to reenter the data. Finally, the form object 58 includes a slot 58*i* that stores a pointer to a help window. As described above, if the customer service representative needs help in completing the form, he or she can activate the help window, which causes a sample form to appear on the video display and may additionally display textual instructions that inform the representative how to complete the form.

The last type of object included in the hierarchy of the present system is a task-type object. An example of a task object is shown as object 60. The task object 60 includes a plurality of slots 60*a*–60*l*. Slot 60*a* signifies the type of object, namely a task object. A slot 60*b* identifies the task. In this example, the task is for changing a customer's long distance carrier. Slots 60*c*–60*g* contain pointers to the individual forms that need to be filled out by the customer service representative to complete the task, i.e., to change a customer's long distance carrier. In this example, it is required that forms 1, 2, 3, 7 and 15 need to be filled out by the customer service representative in order to change a customer's long distance carrier. Each of these forms is produced for the customer service representative in the same way that the object 58 produces "form 1" as described above. As will be readily apparent, there exists in the computer system one task object for each type of customer request that the customer service representative is able to carry out. Each task object includes a pointer to each form object that is required to complete the task. Which forms need to be filled out for a given task is determined when the form generating system is set up. Therefore, it is not necessary that the customer service representative remember the series of forms that must be completed for each type of customer request, since these series are predefined by the various task objects.

The task object further includes a slot 60*h* that stores a segment of computer code that is specific to the task object. Again, the code segment controls the way in which the series of electronic forms is displayed to the customer service representative. Additionally, the code may check for errors in the data entered by the representative as well as modify the electronic forms depending upon the data entered by the representative. For example, if a customer service representative entered some data that required completing an additional form, then the computer code would check for the data and if this data had been entered would cause the additional form to appear on the video display to be entered as a form that needs to be completed to finish a task.

In addition to the segment of computer code contained in the slot 60*h* and the pointers to the various form-type objects required to complete a task, the task object also includes a slot 60*i* that is used to generate a map of the particular task being completed. As will be further described below, the map visually and graphically indicates the series of forms that must be filled out by the customer service representative to complete the task as well as indicates where in the current form in the series the customer representative is working.

A slot 60*j* included in the task object contains a pointer to a help window to provide the customer service representative help in completing the task. At the task level, the help window preferably includes general directions as to the questions that should be asked of the customer, the order in which the forms should be filled out, as well as any special information that is particular to the task being performed. For example, the help window may remind the service representative to ask the customer if they would like a special service option or program that is related to the task being completed.

A slot 60*k* included in the task object contains data to drive a histogram display. As will also be described below, the histogram display provides a visual indication to the customer service representative of how much of the forms required to complete the task at hand have been completed. For example, if there are five forms that are required in order to complete a given task, the histogram data would cause the display to show a bar graph indicating a 20 percent completion, when the customer service representative has completed one of the five forms.

Finally, the task object 60 includes a slot 60*l* that contains text data that is displayed in a reserved window area of the electronic form to provide the customer service representative with general instructions regarding how the task is to be completed.

FIG. 3 is a flow chart 100 showing steps taken by the form generating system according to the present invention to produce a series of forms related to an individual task selected by a customer service representative. As described above, the preferred embodiment of the present invention is implemented using an object-oriented computer language. For purposes of illustration, the flow charts are described as if they occurred sequentially in a linear flow. It is assumed that one of ordinary skill in the art of computer programming could implement the steps described in the flow chart in an object-oriented environment.

Upon initiation at 102, the form generating system begins at a step 104 by displaying a list of all possible tasks that can be selected by the customer service representative. After the list of tasks has been displayed, the system determines if the customer service representative has selected a particular task at a step 106. If the answer is no, the system loops at step 106 until a task is selected. After a particular task is selected, the system proceeds to a step 108 where the sequence of forms that are associated with a particular task object is obtained from memory 26. As is shown in FIG. 2, each task object includes a plurality of slots having pointers to the forms that are required to be filled out in order to complete the particular task. For example, the task object 60 shows that five forms 1, 2, 3, 7 and 15 must be filled out to complete the particular task.

Figure 4:
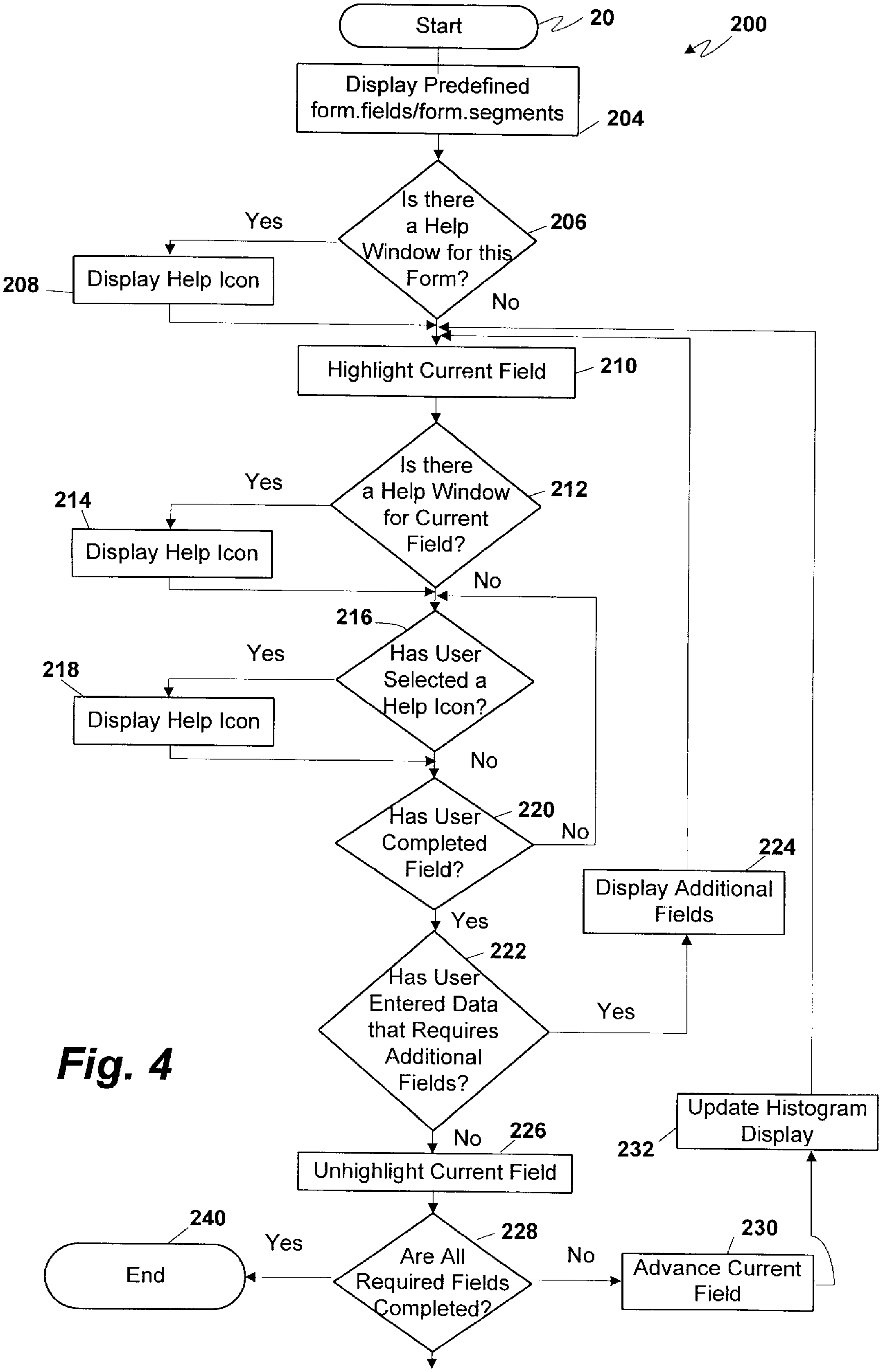
FIG. 4 is a flow diagram that shows how the electronic form generating system produces an electronic form.

After determining the series of forms required by the particular task object, the system displays a task map to indicate to the customer service representatives the forms that must be filled out to complete the task and the point in the series of forms at which the customer service representative is currently working. The task map is displayed at a step 110. After displaying the task map, the system determines if a customer service representative has selected a form out of sequence at a step 112. In the present example described above, this step is illustrated by a customer service representative selecting to complete a form other than form 1 first. If a form has been selected out of order, then the system displays the selected form at a step 114. The details of how a form is displayed on the screen are shown in FIG. 4 and discussed below. After displaying the form at the step 114, the system determines if the selected form has been completed at a step 116. If the answer is no, the system waits at step 116 until the form is complete. In general, the form generating system does not require each field of the form to be filled in in order to complete the form, but rather only those necessary fields must be filled in to complete the form. As will be further described below, those fields that must be filled are determined by the form object's computer code segment.

If the answer at step 112 is no, meaning that the customer service representative has not selected a form out of sequence, the system proceeds to a step 118 wherein the next uncompleted form is displayed. After step 118, the system determines if the form has been completed at step 120. If the answer is no, the system loops at step 120 until the required fields of the form have been completed. Upon completion of the form, the system proceeds to a step 122, wherein the task map is updated to reflect the fact that the form has been completed. The customer service representative is thereby informed by looking at the task map of the forms that are left to be completed. After step 122, the system determines if all forms in the series of forms required to finish the particular task selected have been completed at 124. If all forms in the series have been completed, the system returns to step 104 and the list of possible tasks is redisplayed and the whole process starts over. If all forms in the series of forms have not been completed, the system returns to step 112 and prompts the customer service representative to complete another form.

FIG. 4 is a flow chart 200 showing the steps taken by the form generating system to produce an electronic form. As described above, these steps are executed by the code segment contained within a form-type object. The code segment causes the form generating system to perform a range of functions that vary from such low level tasks as highlighting those fields that must be filled in to complete the form, to reminding the customer service representative to mention special discounts or programs being offered by the telephone company.

The system starts at a step 202 and proceeds to a step 204 wherein each field for the particular form is shown on the video display. The particular fields required for a form are determined by the pointers to the various form.field or form.segment objects contained in the form object's slots, similar to slots 58_c_–58_g_ shown in FIG. 2.

After step 204, the system determines if a help window exists for the form at a step 206. If a help window does exist, at a step 208 the system causes an icon to be displayed on the video display, alerting the customer service representative that a help window is available. After displaying the help icon at step 208, the system proceeds to a step 210. If a help window is not available for the particular form, the system proceeds directly from a decision step 206 to the step 210.

At step 210, the system causes those fields that must be completed by the customer service representative to be sequentially set off or highlighted. This provides an instant visual cue to the customer service representative, indicating the fields that must be filled out to complete the form. Each time a required field is completed, the next required field is highlighted, until all the required fields have been filled in.

After step 210, the system determines if there exists a help window for the current highlighted field. If a help window exists, the system branches to a step 214 that displays a help icon on the video display indicating that such a help window exists. After step 214, the system proceeds to a step 210. If no help window exists for the current highlighted field, then the system goes directly from step 212 to a step 216.

At step 216, the system determines whether a customer service representative has selected a help icon. (This selection initiates an interrupt that vectors to step 218). If so, the appropriate help window is displayed on the video screen at a step 218. After displaying the help window, the system proceeds to a step 220. Similarly, if the customer service representative has not selected a help icon, the system proceeds directly from step 216 to a step 220.

At step 220, the system determines whether the customer service representative has completed the current field. If the customer service representative has not completed the current field, the system returns to step 216 until the current field is completed. Once the customer service representative has completed the current field, the system proceeds from step 220 to a step 222. At step 222, the system determines if the customer service representative has entered data that require additional fields to be displayed. If the customer service representative has entered such data, the system proceeds to a step 224, wherein the additional fields to be filled in are displayed. After step 224, the system proceeds to step 210, where the newly added fields are highlighted. If the answer at step 222 is no, meaning that the customer service representative has not entered data that requires additional fields, the system proceeds directly to a step 226 wherein the current field is unhighlighted.

After step 226, the system proceeds to a step 228 wherein the system determines if all the required fields are completed. If the answer is no, the system proceeds to a step 230, wherein the current field is advanced. After step 230, the system returns to step 210 wherein the new current field is highlighted for the customer service representative to fill in. After advancing the current field, the system updates the histogram display at a step 232. If all the required fields have been completed, the system proceeds from decision step 228 to end step 240.

Figure 5:
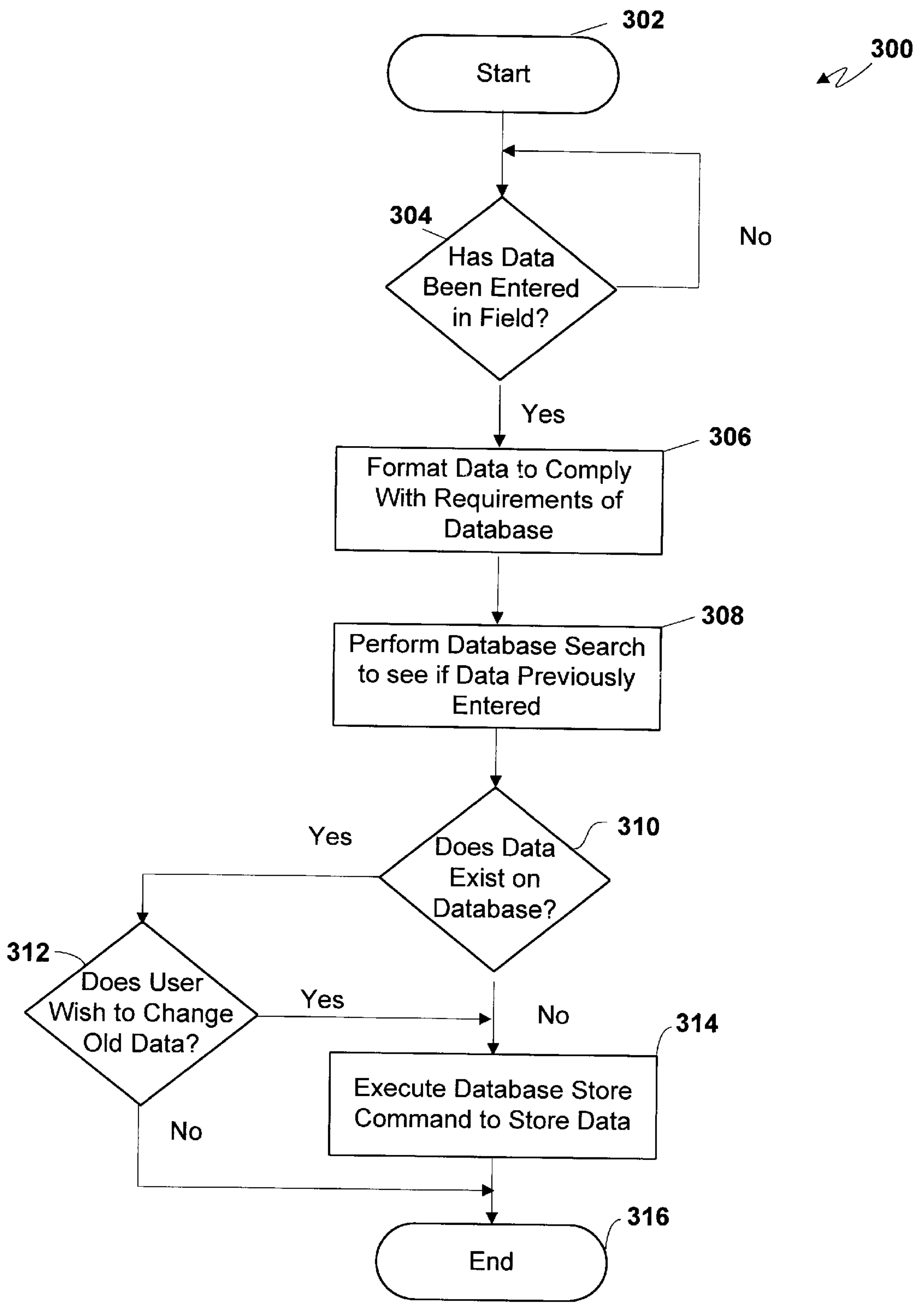
FIG. 5 is a flow diagram that shows how a form field-type object accesses its corresponding database.

FIG. 5 is a flow diagram 300 showing the steps taken by the form generating system when data are entered into a field by the customer service representative. As will be appreciated by those skilled in the art, the particular steps taken by the form generating system are determined by the form.field's code segment. The code segment may cause the form generating system to perform a variety of tasks, such as entering the data in one or more data bases, checking the spelling of the data, or manipulating the data to be compatible with one or more databases.

The system starts at a step 302 and determines if data have been entered into the field at a step 304. If no data are yet entered into the field, the system waits at step 304 until the field is completed. Once data have been entered into the field, the system proceeds to a step 306 that formats the data in a way in which the fields associated database expects the data to be formatted. Obviously, this step is dependent upon the particularities of the field's associated database. After step 306, the system proceeds to a step 308 wherein the system performs a database search. At a step 310, the system determines if the data have been previously stored on the database. For example, if the customer service representative entered a new name into the "name" field of a form, the system searches the database that contains the company's current customers to see if the name is in the customer database. If the data have been previously stored, the system proceeds to a step 312 that prompts the customer service representative to decide whether to change the stored data. If the data entered by the customer service representative do not replace data already on the database, no further action is required. However, if the data are to be updated or if there were no corresponding entries previously stored in the database, the system proceeds to a step 314 wherein a series of database commands appropriate to the database are executed to store the data in the field's associated database.

As described above, the actual functions performed by the code segment associated with each form.field may vary depending upon the result required. However, in order for the data to be stored in the form.field's associated database, it is necessary that at least some of the computer code contained within the code segment be written such that the database associated with the form.field can accomplish the result desired. That is to say, the code segment must be written in the database's own computer language. This step allows the data to be stored in the associated database without the customer service representative having to separately enter the database and without the need to know the instructions for that database that are required to enter the data. Additionally, if a field has more than one associated database, the code segment for the form.field object causes the system to store the data in each database.

As can be seen, the form generating system according to the present invention serves to step the customer service representative through those fields that must be filled out in order to properly complete a form. Data entered by the customer service representative are automatically stored in the correct databases by the code segments that are associated with each individual form.field as described above. Therefore, the interactions with the different databases are transparent to the customer service representative as an individual form is being filled out.

Figure 6:
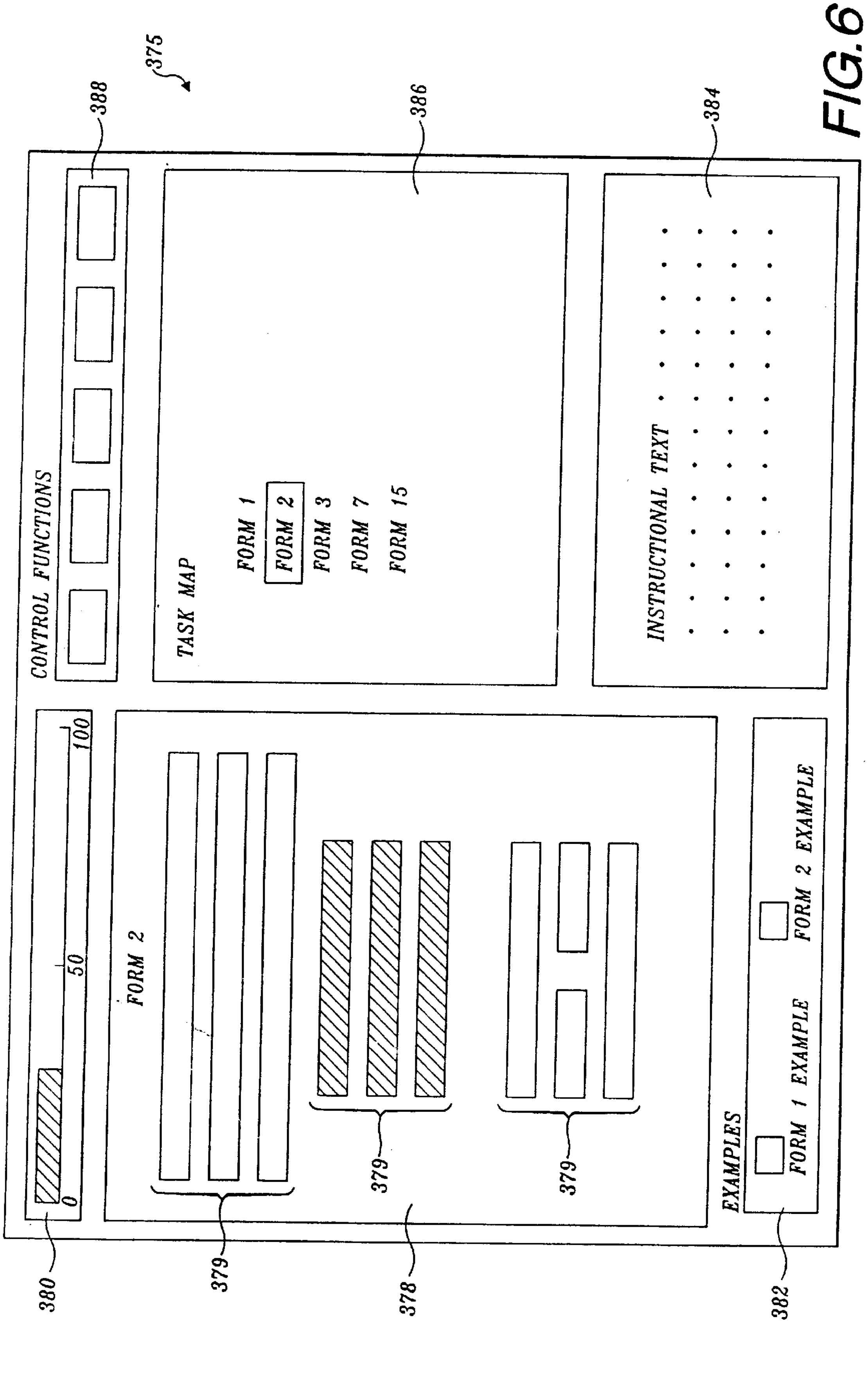
FIG. 6 illustrates an example of a form created by the electronic form generating system according to the present invention.

FIG. 6 shows an illustration of an electronic display 375 produced by the form generating system as it is presented on the video display to the customer service representative. The electronic display 375 contains a number of windows each having a separate function. The actual electronic form to be filled out by the service representative is shown in a window 378. The form contains numerous fields 379 that are to be filled in by the customer service representative. The individual fields are highlighted sequentially to indicate which fields are important while some may remain darkened or unhighlighted to indicate those fields which do not necessarily have to be filled in to complete the form. Above the form is the histogram display 380. As described above, the histogram display provides a visual indication of how much of the task has been completed by the customer service representative. Upon completion of each field within the series of forms associated with the task, the histogram display is updated until all the forms required to complete the task have been filled in. Below the form shown in window 378 is an examples window 382 that contains icons that alert the customer service representative that an example is available to be viewed. If the customer service representative selects a help icon by clicking on it with a mouse or using a keystroke, a corresponding window appears that illustrates how the particular field or form is to be filled out. As described above, some help windows show how an entire form is to be filled in, while others show how a particular segment of a form is to be filled in.

In the upper right hand corner of the display 375 is a window 388 that contains a series of control buttons. These control buttons can be selected by the customer service representative using the mouse. The control buttons activate different functions of the computer system as is common on modem computer programs having a graphical customer service representative interface. Below the control buttons window 388 is the task map 386 that provides an indication to the customer service representative illustrating the forms that need to be filled out to complete a particular task. For example, the object that corresponds to the task of changing a customer's long distance carrier illustrated in FIG. 2 requires forms 1, 2, 3, 7 and 15 to be completed. The current form that the customer service representative is filling in is indicated, so that the customer service representative can identify the relative portion of the task being completed. Once a form has been completed, the task map visually indicates the form as having been completed on the video display, to inform the customer service representative of the forms remaining to be filled in.

Below the task map 386 is a window 384, which provides general instructions regarding the completion of the task. Such instructions may include the order in which the forms should be filled out, any peculiarities of the form that should be noted, any special questions that should be asked to the customer, and other helpful information to enable the customer service representative to more efficiently complete the task.

Figure 7:
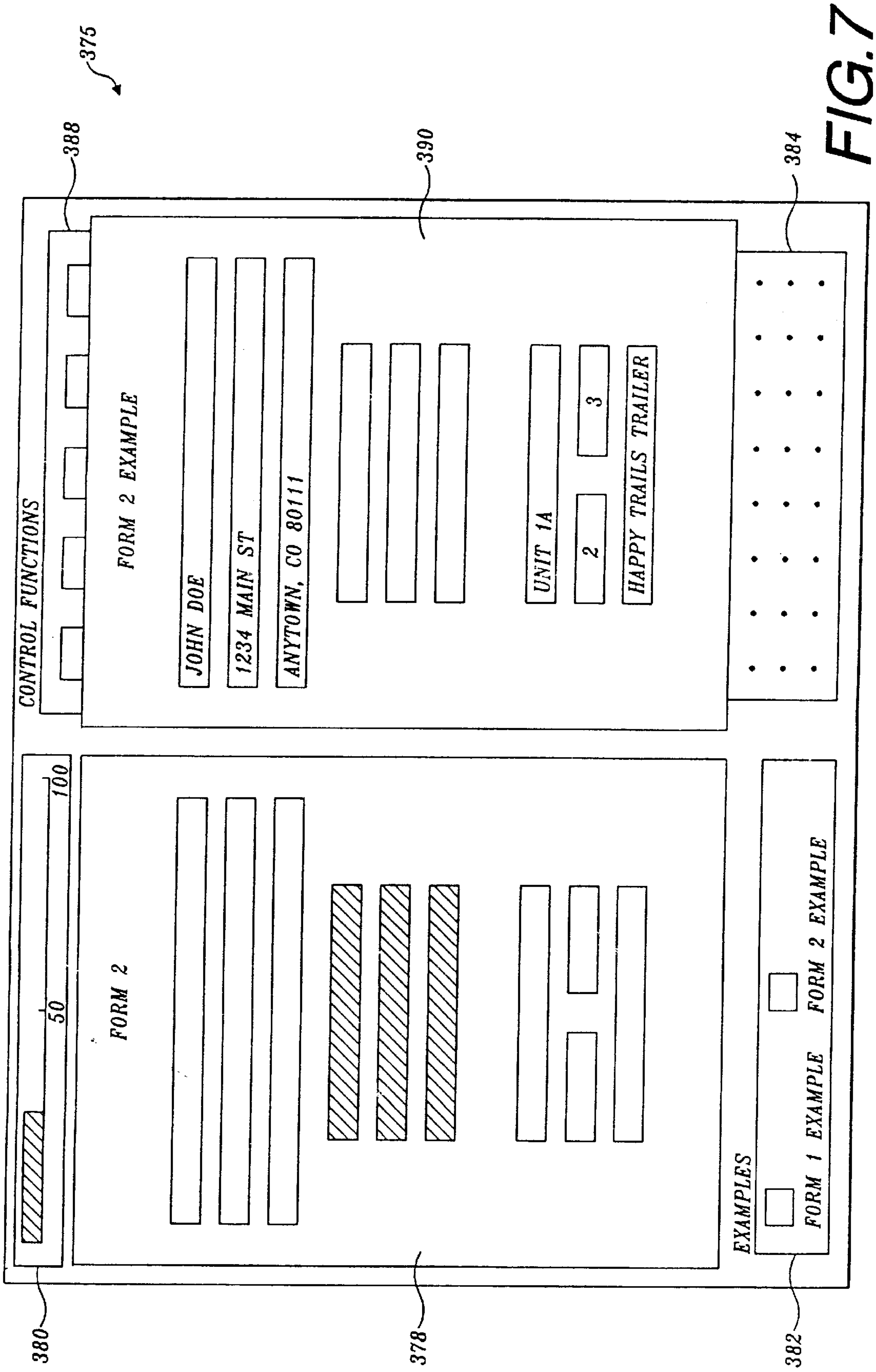
FIG. 7 illustrates a help window produced by the form generating system to aid a customer service representative in completing a form.

FIG. 7 shows an example of a help window 390 displayed when the customer service representative selects a help window icon from the examples window 382 described above. Upon selecting the help window icon, an example window is displayed on the right hand side of the screen. The help window 390 shows a sample form or form segment as the system expects it to be completed by the customer service representative. By viewing the sample window, the representative can determine how to complete the form shown in window 378, thereby enabling the representative to quickly and easily complete the task at hand. After viewing the example window 390, the customer service representative simply closes the sample window and continues completing the form in window 378.

The preferred embodiment of the present invention has been implemented utilizing the KEE® object-oriented programming environment provided by IntelliCorp, Inc., of Mountain View, Calif. The KEE® system provides a LISP programming environment which facilitates the development of object-oriented programs as well as provides a graphics platform used by the form generating system to create the windows on the video display. However, the present system could be implemented using other object-oriented computer languages, on linear programming languages.

While the preferred embodiment of the invention has been illustrated and described, variations will be apparent to those skilled in the art. For example the present invention is not limited for use in the telecommunication industry, but could be used in any situation where forms providing or using data stored in different databases must be filled out, or in situations where operators are required to fill out various combinations of forms in order complete a task. Accordingly, the scope of the invention is to be determined entirely by reference to the following claims, and not limited by the disclosure.

The embodiments of the invention in which an exclusive property or privilege is claimed are defined as follows:

1. A method of integrating an electronic customer service call-related data entry form on a computer system with a data storage system comprising at least first and second data bases, said computer system comprising a display screen, said method comprising the steps of:

determining a plurality of fields for said electronic form to be associated with at least one predetermined customer service call, each said field corresponding with a predetermined category of data;

defining each said field by a field structure, said field structure directing a selective transfer of data entered into said field to a database destination associated with said field;

displaying said plurality of fields on said display screen;

entering data into at least one of said fields, including entering data into a first of said fields; and transferring said data from said at least one field into at least one data base, said transferring step further comprising the step of transferring said data from said first field into each of said first and second data bases by said field structure of said first field.

2. The method of claim 1, wherein said entering step comprises entering data into a second of said fields associated with at least said second data base, said method further comprising the step of searching said second data base to determine if said data from said second field is in said second data base, said searching step being performed before said transferring step associated with said second field.

3. The method of claim 2, further comprising the step of performing said transferring data associated with said second field step only if said data from said second field is determined to be absent from said second data base by said searching step.

4. The method of claim 1, wherein said entering step further comprises transferring data from at least one of said first and second data bases into a second of said fields, said displaying step comprising displaying said data in said second field.

5. The method of claim 1, wherein a first format is required for data input into said first data base and a second format is required for data input into said second data base, said first and second formats being different, said transferring step further comprising the steps of providing said data in said first field in said first format to said first data base and providing said data in said first field in said second format to said second data base.

6. The method of claim 1, further comprising the step of displaying at least one additional field after said entering data step for at least one of said fields.

7. The method of claim 1, further comprising the step of indicating an order for said entering step.

8. The method of claim 7, wherein said indicating step comprises sequentially highlighting one of said fields for which said entering step is to be performed.

9. The method of claim 1, further comprising the steps of determining if data has been entered into a second of said fields and repeating said entering step for said second field until data has been entered into said second field.

10. A method, as claimed in claim 1, further comprising the steps of:

displaying a plurality of customer service call tasks on a display screen;

selecting one of said tasks; and generating a series of customer service call-related data entry forms from said selecting step, said electronic customer service call-related data entry form comprising one of said series of forms.

11. A method, as claimed in claim 1, wherein:

said field structure comprises first, second, and third parts, said first part identifying a type of data for said field, said second part identifying a database destination for data entered into said field, and said third part providing computer code for transferring said data entered into said field to said database destination.

12. A method, as claimed in claim 11, wherein:

said field structure of each said field further comprises a fourth part, said fourth part identifying a type of object associated with said field.

13. A methods, for producing electronic customer service call-related data entry forms on a computer system comprising a display screen, said method comprising the steps of:

displaying a plurality of customer service call tasks on a display screen;

selecting one of said customer service call tasks;

generating a series of electronic customer service call-related data entry forms from said selecting step comprising a plurality of forms, each said form comprising a plurality of fields for containing a predetermined category of data, wherein for each said form within said series the associated fields are displayed;

defining each said field by a field structure, said field structure directing a selective transfer of data entered into said field to a database destination associated with said field; and entering data into each of said fields for each said form in said series, wherein at least a portion of said entering step is in response to information provided by a customer requesting said customer service call task; and transferring data from a first of said fields to first and second data bases by said field structure of said first field.

14. A method, as claimed in claim 13, wherein said transferring step comprises conforming said data from said first field to a data format requirement for each of said first and second data bases, said data format requirements for said first and second data bases being different.

15. A method, as claimed in claim 13, wherein:

said field structure comprises first, second, and third parts, said first part identifying a type of data for said field, said second part identifying a database destination for data entered into said field, and said third part providing computer code for transferring said data entered into said field to said database destination.

16. A method, as claimed in claim 15, wherein:

said field structure of each said field further comprises a fourth part, said fourth part identifying a type of object associated with said field.

17. A method for producing an electronic customer service call-related data entry form on a computer system, said form comprising a plurality of fields each corresponding with a predetermined category of customer service call-related information and said computer system comprising a display screen, a manual data entry device, and at least a first data base and a second data base, wherein a first format is required for data input into said first data base and a second format is required for data input into said second data base, said first and second formats being different, said method comprising the steps of:

defining each said field by a field structure, said field structure directing a selective transfer of data entered into said field to a database destination associated with said field;

displaying said plurality of fields on said display screen;

entering data into at least one of said fields in accordance with said predetermined category of customer service call-related information associated with said at least one field, said entering step comprising transferring data from said first data base to a first of said fields and using said manual data entry device for a second of said fields; and transferring said data from at least one of said plurality of fields into at least one data base, said transferring step further comprising the steps of providing said data from at least a third of said fields at least to said first data base in said first format and to said second data base in said second format by said field structure of said third field.

18. A method, as claimed in claim 17, further comprising the step of displaying at least one additional field after said entering data step for at least one of said fields.

19. A method, as claimed in claim 17, further comprising the step of indicating an order for said entering step.

20. A method, as claimed in claim 19, wherein said indicating step comprises sequentially highlighting one of said fields for which said entering step is to be performed.

21. A method, as claimed in claim 17, further comprising the steps of determining if data has been entered into a second of said field and repeating said entering step for said second field until data has been entered into said second field.

22. A method, as claimed in claim 17, further comprising the steps of:

displaying a plurality of customer service call tasks on a display screen;

selecting one of said tasks; and generating a series of data entry forms from said selecting step, said electronic customer service call-related data entry form comprising one of said series.

23. A method, as claimed in claim 17, wherein:

said field structure comprises first, second, and third parts, said first part identifying a type of data for said field, said second part identifying a database destination for data entered into said field, and said third part providing computer code for transferring said data entered into said said field to said database destination.

24. A method, as claimed in claim 23, wherein:

said field structure further comprises providing a fourth part, said fourth part identifying a type of object associated with said field.

* * * * *